United States Patent
Clunies et al.

(10) Patent No.: US 8,501,251 B2
(45) Date of Patent: Aug. 6, 2013

(54) PREMIX FOR HOG FEED AND A METHOD OF FEEDING A HOG TO PRODUCE DHA AND EPA ENRICHED PORK

(75) Inventors: Martin Clunies, Branchton (CA); James Ross, Branchton (CA); Ian Ross, Ayr (CA)

(73) Assignee: Grand Valley Fortifiers, Ltd., Cambridge, Ontario (CA)

( * ) Notice: Subject to any disclaimer, the term of this patent is extended or adjusted under 35 U.S.C. 154(b) by 295 days.

(21) Appl. No.: 12/354,445

(22) Filed: Jan. 15, 2009

(65) Prior Publication Data
US 2010/0178379 A1    Jul. 15, 2010

(51) Int. Cl.
*A23K 1/18*  (2006.01)
*A23K 1/00*  (2006.01)
*A23B 7/10*  (2006.01)
*A23L 1/20*  (2006.01)
*A23L 1/325* (2006.01)

(52) U.S. Cl.
USPC .................. 426/2; 426/54; 426/630; 426/643

(58) Field of Classification Search
USPC ................................................. 426/2, 54, 630
See application file for complete search history.

(56) References Cited

U.S. PATENT DOCUMENTS
5,614,553 A  * 3/1997 Ashmead et al. ............. 514/505

FOREIGN PATENT DOCUMENTS
CA        2 502 584 A1   5/2004

OTHER PUBLICATIONS

Leskanich et al., The Effect of Dietary Oil (1997). J. Anim Sci. 75 (3) 673.*
Benefits of Fish Oil Supplements to the Human Body Seven Seas (2009). Available on-line: http://www.sevenseas.com/nutrients/fish-oil.*
Fat Content and Fatty Acid Compositoin of Seed Oils (Feb. 1, 2001). Available on-line: http://curezone.com/foods/fatspercent.asp.*
Sioutis et al., N-3 enrichment of pork with fishmeal (2008). Eur. J. Lipid Sci. Technol. 2008, 110, 701-706.*
Romans et al., Effects of Ground Flaxseed in Swine Diets (1995). J. Anim Sci. Romans et al. 73 (7) 1987.*
Howe et al., Tuna Fishmeal as a Source of DHA (2002). Lipids, vol. 37, No. 11.*
Nursery and Grow-Finish Performance and Carcass Characteristics in Boars Fed Diets Supplemented with Organic or Inorganic Sources of Selenium. Available online at www.thepigsite.com on Apr. 3, 2007.*

* cited by examiner

*Primary Examiner* — Rena Dye
*Assistant Examiner* — Assaf Zilbering
(74) *Attorney, Agent, or Firm* — Maschoff Brennan

(57) ABSTRACT

A premix for hog feed and a method of feeding a hog that produces DHA and EPA enriched pork while avoiding or reducing negative effects to the taste, color, texture, aroma, pH and shelf life which are significant enough to make the pork unacceptable to consumers. One embodiment of the method of feeding a hog involves feeding a hog over several days with a hog feed supplemented with the premix. The premix includes marine-sourced docosahexaenoic acid (DHA) and eicosapentaenoic acid (EPA) and plant-sourced alpha-linolenic acid (ALA). The hogs are fed until their total DHA, EPA and ALA intakes are in a certain range per kilogram of the hog's weight. The hogs are then slaughtered and processed into pork products. This results in pork with an enrichment of omega-3 EFAs in the range of about 2.5% to about 4.5% of fat.

13 Claims, 1 Drawing Sheet

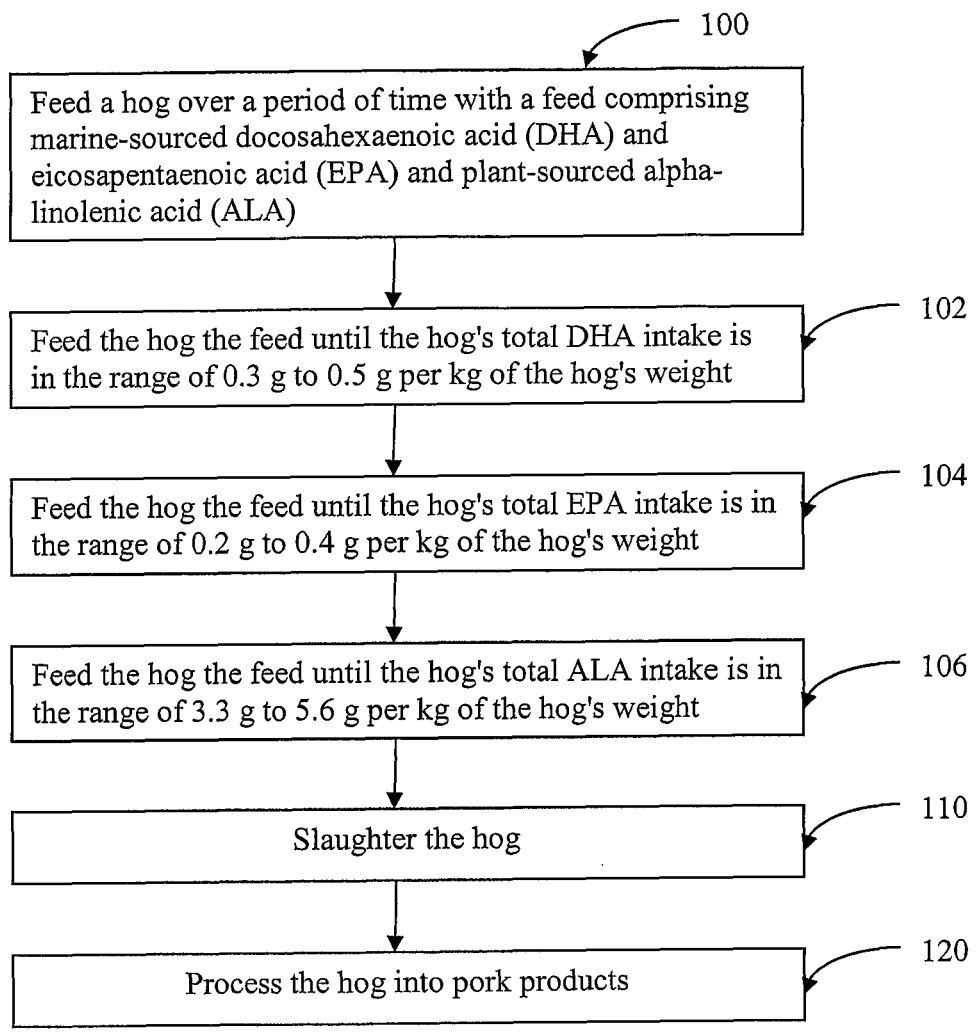

PREMIX FOR HOG FEED AND A METHOD OF FEEDING A HOG TO PRODUCE DHA AND EPA ENRICHED PORK

FIELD OF THE APPLICATION

The present application relates to a premix for hog feed and a method of feeding a hog, and more particularly, a premix and a method of feeding a hog that results in DHA and EPA enriched pork.

BACKGROUND OF THE APPLICATION

Omega-3 Essential Fatty Acids (EFAs) are fatty acids that are important to human health but cannot be constructed within the human body and therefore must be obtained by diet. Most omega-3 EFAs come from marine and plant sources. Eicosapentaenoic Acid (EPA) and Docosahexaenoic Acid (DHA) come primarily from marine sources, such as cold-water fishes, for example, salmon. Alpha-Linolenic Acid (ALA) comes primarily from plant sources, such as nuts, seeds, or vegetables.

Most people, especially North Americans, do not consume enough omega-3 EFAs to meet their daily nutritional needs. And in addition to consuming enough omega-3 EFAs, the ratio of omega-3 EFAs to omega-6 EFAs consumed is also important. Desirable ratios of omega-3 to omega-6 are in the 1:1 to 1:5 range. However, many food products such as milk and other dairy products contain omega-3 to omega-6 ratios of 1:5 or higher. North American diets as a result are typically too heavily weighted to omega-6 EFAs, which may contribute to a number of health problems including heart disease.

Various foods have been enriched with omega-3 EFAs, such as bread, eggs and milk. Flaxseed is the most common source for omega-3 EFA enrichment since it is comparatively better tasting than marine sources of omega-3 EFAs. Most people find a fishy taste in non-fish foods unpleasant. But while flax is high in ALA, it is not as rich in DHA and EPA. Evidence has shown that greater health benefits come from the consumption of DHA and EPA than from the consumption of ALA. Nevertheless, marine-sourced omega-3 EFA enrichment of foods, for example meat products, has not been successful due to the poor taste of the enriched food product, as well as due to negative effects on the texture, colour, aroma, pH and shelf life of the enriched food product.

Selenium is a mineral that is also important to human and animal diets as a component of the antioxidant enzyme system. In particular, selenium is a component of the enzyme glutathione peroxidase which neutralizes toxic peroxides that are formed during the conversion of body fat to energy. Absent neutralization, these peroxides can damage cell components and cause a range of health problems, including cancer. Selenium is also a component of more than 20 other functional proteins in the body, most of which have some type of protective function.

Many humans are deficient in selenium, to a large extent because the majority of livestock feed grains and soybeans are being grown in regions where the soil is low in selenium. This causes selenium deficiencies in the animals consuming the feed and consequently in humans consuming the animal products.

Accordingly, there remains a need for improvements in enriched food products.

BRIEF SUMMARY OF THE INVENTION

According to one aspect, the present invention provides a method of feeding a hog that results in DHA and EPA enriched pork while avoiding or reducing negative effects to the taste, colour, texture, aroma, pH and shelf life which are significant enough to make the pork unacceptable to consumers. According to another aspect, the present invention provides a premix for hog feed.

According to one embodiment, the present invention provides a method of feeding a hog to produce pork enriched with omega-3 Essential Fatty Acids (EFAs), the method comprising, feeding a hog a feed; wherein the feed comprises marine-sourced docosahexaenoic acid (DHA) and eicosapentaenoic acid (EPA) and plant-sourced alpha-linolenic acid (ALA); and wherein said feed is fed to the hog over a period of time until the hog's total DHA intake is in the range of 0.3 g to 0.5 g per kg of the hog's weight, the hog's total EPA intake is in the range of 0.2 g to 0.4 g per kg of the hog's weight, and the hog's total ALA intake is in the range of 3.3 g to 5.6 g per kg of the hog's weight.

According to another embodiment, the present invention provides a premix for hog feed comprising: a marine-sourced docosahexaenoic acid (DHA) and a marine-sourced eicosapentaenoic acid (EPA); a plant-sourced alpha-linolenic acid (ALA); and organic selenium.

According to another embodiment, the present invention provides a method of feeding a hog to produce pork products with omega-3 Essential Fatty Acids (EFAs), the method comprising the steps of: feeding a hog a feed supplemented with a premix; wherein said premix comprises marine-sourced docosahexaenoic acid (DHA) and eicosapentaenoic acid (EPA) and plant-sourced alpha-linolenic acid (ALA); wherein said feed is fed to the hog over a period of time until the hog's total DHA intake is in the range of 0.3 g to 0.5 g per kg of the hog's weight, the hog's total EPA intake is in the range of 0.2 g to 0.4 g per kg of the hog's weight, and the hog's total ALA intake is in the range of 3.3 g to 5.6 g per kg of the hog's weight; slaughtering the hog; processing the hog into one or more pork products; and wherein that the pork products have an enrichment of omega-3 EFAs in the range of about 2.5% to about 4.5% of fat.

Other aspects and features according to the present application will become apparent to those ordinarily skilled in the art upon review of the following description of embodiments of the invention in conjunction with the accompanying FIGURE.

BRIEF DESCRIPTION OF THE DRAWINGS

Reference will now be made to the accompanying drawing which shows, by way of example, embodiments of the invention, and how they may be carried into effect, and in which:

FIG. 1 shows in flowchart form an exemplary method of feeding a hog that produces DHA and EPA enriched pork while avoiding negative effects to the taste, colour, texture, aroma, pH and shelf life significant enough to make the pork unacceptable to consumers according to an embodiment.

Like reference numerals indicate like or corresponding elements in the drawings.

DETAILED DESCRIPTION OF THE EMBODIMENTS

Embodiments of the present invention are generally directed to a premix and a method of feeding a hog that produces DHA and EPA enriched pork while avoiding or reducing negative effects to the taste, colour, texture, aroma, pH and shelf life which are significant enough to make the pork unacceptable to consumers.

One way to make people more likely to meet their daily omega-3 EFA and selenium recommended dietary allowances is to enrich foods that people typically consume. While omega-3 EFAs are found in fish and other marine matter, it is beneficial to enrich other foods that are regularly consumed by humans, such as pork.

EPA and DHA come primarily from marine sources, mainly fish that live in cold water. Fish high in omega-3 EFAs include: salmon, trout, white tuna, king mackerel, sea bass, halibut, herring, oysters and sardines. Algae (or algal oil) is also high in EPA and DHA.

ALA comes primarily from plant sources. Plant sources high in omega-3s include algae (algal oil), flaxseed, English walnuts, sunflower seeds, canola oil, safflower oil, soy, wheat germ, dark leafy greens such as kale, spinach, parsley, etc. and corn oil.

To increase the total omega-3 EFA concentrations in pork cuts using marine-sourced DHA and EPA and plant-sourced ALA, it is desirable to enrich the pork to 2.5% to 4.5% of fat as omega-3 EFA. It has been found that such a concentration does not negatively affect the taste, colour, texture, aroma, pH and/or shelf life of the pork to an extent that is commercially significant.

Feeding hogs omega-3 EFA-containing diets for longer durations and feeding higher dietary levels of omega-3 EFAs to hogs increases omega-3 EFA concentrations in the pork. A good predictor of omega-3 EFA profiles in hogs, without considering the duration of feeding, is to consider the absolute amount of omega-3 EFA consumed by the hog. Longer durations of feeding to reach a certain absolute amount of omega-3 EFAs tends to reduce the variability in the omega-3 EFA profile between hogs, primarily due to there being greater variability in a hog's feed intake across fewer days.

According to an embodiment, the levels of omega-3 EFAs among a plurality of hogs going to market at different times can be made more uniform by stopping the feeding of omega-3 EFAs to the hogs when the first hogs go to market and/or by feeding lower levels of omega-3 EFAs to the hogs for longer periods of time. It will be appreciated that once the meat goes to a processing facility for slaughter and subsequent processing, it is too late to alter the omega-3 EFA enrichment levels of the meat.

According to an embodiment, a method for feeding a hog to enrich resultant pork products with omega-3 Essential Fatty Acids (EFAs) comprises feeding a hog over a period of time, typically, a period of weeks (for example, in the range of about 10 to 79 days) with a feed that includes marine-sourced docosahexaenoic acid (DHA) and eicosapentaenoic acid (EPA) and plant-sourced alpha-linolenic acid (ALA), as indicated by reference 100 in FIG. 1. According to an embodiment, the hog feed has a ratio of omega-3 EFAs to omega-6 EFAs in the range of about 1:1 to about 1:4. According to an embodiment, a premix, such as a vitamin and mineral premix, or feed supplement comprising marine-sourced DHA and EPA and plant-sourced ALA has been added to the feed. According to an embodiment, the premix has a ratio of omega-3 EFAs to omega-6 EFAs in the range of about 3:1 to about 6:1. According to another embodiment, the feed contains marine-sourced DHA and EPA and plant-sourced ALA without a premix or feed supplement having been added. According to an embodiment, the hog is fed the feed until the hog's total DHA intake is in the range of 0.3 g to 0.5 g per kg of the hog's weight, as indicated by reference 102. According to an embodiment, the hog is fed the feed until the hog's total EPA intake is in the range of 0.2 g to 0.4 g per kg of the hog's weight, as indicated by reference 104. According to an embodiment, the hog is fed the feed until the hog's total ALA intake is in the range of 3.3 g to 5.6 g per kg of the hog's weight, as indicated by reference 106 in FIG. 1. The next step as indicated by step 110 involves slaughtering the hog, which may be done at a processing facility. Next the hog is processed into one or more types of pork products, as indicated by reference 120, which also may be done at the processing facility. According to an embodiment of the method, the pork product ought to have an enrichment of omega-3 EFAs in the range of about 2.5% to about 4.5% of fat.

Organic selenium may also be included in the vitamin and mineral premix. There is evidence that the use of organic selenium in the premix leads to higher concentrations of selenium in pork cuts, unlike the use of inorganic selenium which tends to only benefit the live animal. Moreover, organic selenium improves the shelf life of the pork product. As omega-3 enrichment tends to negatively impact the shelf life of the pork product, the improvement of the shelf life of the enriched pork product from including organic selenium may be commercially advantageous. There is also evidence selenium consumption has numerous health benefits for humans and animals, as discussed above.

According to one aspect, the present invention provides an improved enriched food product and method for producing enriched food products that serves to address nutritional deficiencies while avoiding negative effects to the taste, colour, texture, aroma, pH and shelf life of the enriched food product which are significant enough that the enriched food product is unacceptable to consumers.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of feeding a hog to produce pork enriched with omega-3 Essential Fatty Acids (EFAs), said method comprising:
   feeding a hog a feed;
   wherein said feed comprises marine-sourced docosahexaenoic acid (DHA) and eicosapentaenoic acid (EPA), plant-sourced alpha-linolenic acid (ALA), and organic selenium; and
   wherein said feeding provides a sufficient amount of the feed to the hog until the hog's total DHA intake is in the range of 0.3 g to 0.5 g per kg of the hog's weight, the hog's total EPA intake is in the range of 0.2 g to 0.4 g per kg of the hog's weight, and the hog's total ALA intake is in the range of 3.3 g to 5.6 g per kg of the hog's weight.

2. The method of feeding a hog as claimed in claim 1, wherein the feeding is approximately 10 to 79 days.

3. The method of feeding a hog as claimed in claim 1, wherein the marine-sourced DHA is obtained from fish.

4. The method of feeding a hog as claimed in claim 1, wherein the feed comprises flaxseed.

5. The method of feeding a hog as claimed in claim 1, wherein the hog feed includes omega-3 EFAs and omega-6 EFAs, and the feed has a ratio of omega-3 EFAs to omega-6 EFAs in the range of about 1:1 to about 1:4.

6. A premix for hog feed comprising: marine-sourced docosahexaenoic acid (DHA) and eicosapentaenoic acid (EPA); plant-sourced alpha-linolenic acid (ALA); and organic selenium.

7. The premix as claimed in claim 6, wherein the marine source is fish.

8. The premix as claimed in claim 6, wherein the plant source is flaxseed.

9. The premix as claimed in claim 6, wherein the premix includes omega-3 EFAs and omega-6 EFAs, and the feed has a ratio of omega-3 EFAs to omega-6 EFAs in the range of about 3:1 to about 6:1.

10. A method of feeding a hog to produce pork products with omega-3 Essential Fatty Acids (EFAs), said method comprising the steps of:

feeding a hog a feed supplemented with a premix;

wherein said premix comprises marine-sourced docosahexaenoic acid (DHA) and eicosapentaenoic acid (EPA), plant-sourced alpha-linolenic acid (ALA), and organic selenium; and wherein said feeding provides a sufficient amount of the feed to the hog until the hog's total DHA intake is in the range of 0.3 g to 0.5 g per kg of the hog's weight, the hog's total EPA intake is in the range of 0.2 g to 0.4 g per kg of the hog's weight, and the hog's total ALA intake is in the range of 3.3 g to 5.6 g per kg of the hog's weight;

slaughtering the hog when the intake is within the recited ranges per hog's weight;

processing the hog into one or more pork products; and wherein that the pork products have an enrichment of omega-3 EFAs in the range of about 2.5% to about 4.5% of fat.

11. The method of feeding a hog as claimed in claim 10, wherein the feeding is approximately 10 to 79 days.

12. The method of feeding a hog as claimed in claim 10, wherein the marine-sourced DHA is obtained from fish.

13. The method of feeding a hog as claimed in claim 10, wherein the feed comprises flaxseed.

* * * * *